United States Patent [19]

Krause et al.

[11] Patent Number: 5,916,404
[45] Date of Patent: Jun. 29, 1999

[54] FLUOROPOLYMER COMPOSITE TUBE AND METHOD OF PREPARATION

[75] Inventors: Edward K. Krause, Ann Arbor; Kenneth J. Kuenzel, Grass Lake; Jerry J. Smith, Jackson, all of Mich.

[73] Assignee: Pilot Industries, Inc., Dexter, Mich.

[21] Appl. No.: 08/707,663

[22] Filed: Sep. 4, 1996

Related U.S. Application Data

[63] Continuation-in-part of application No. 08/265,679, Jun. 24, 1994, Pat. No. 5,759,329, which is a continuation-in-part of application No. 08/083,042, Jun. 24, 1993, abandoned, which is a continuation-in-part of application No. 07/817,304, Jan. 6, 1992, abandoned, and a continuation-in-part of application No. 08/403,499, Mar. 14, 1995, Pat. No. 5,554,425, which is a division of application No. 08/200,941, Feb. 23, 1994, abandoned, which is a continuation of application No. 07/817,304, Jan. 6, 1992, abandoned.

[51] Int. Cl.$^6$ .................................................. B29C 47/06
[52] U.S. Cl. ................. 156/244.23; 156/82; 156/244.11
[58] Field of Search .................... 427/40, 222; 156/82, 156/244.11, 244.23, 244.13, 244.17

[56] References Cited

U.S. PATENT DOCUMENTS

| | | | |
|---|---|---|---|
| 3,017,339 | 1/1962 | Dewey ..................................... | 204/169 |
| 3,133,854 | 5/1964 | Simms ..................................... | 156/272.6 |
| 3,317,339 | 5/1967 | Fortner et al. . | |
| 3,352,714 | 11/1967 | Anderson et al. ........................ | 117/213 |
| 3,361,607 | 1/1968 | Bruno . | |
| 3,364,056 | 1/1968 | Seibel . | |
| 3,375,126 | 3/1968 | Nagel . | |
| 3,455,774 | 7/1969 | Lindsey et al. .......................... | 136/272.6 |
| 3,457,139 | 7/1969 | James ...................................... | 156/272.6 |

(List continued on next page.)

FOREIGN PATENT DOCUMENTS

| | | |
|---|---|---|
| 686119 | 5/1964 | Canada . |
| 0185590 | 6/1986 | European Pat. Off. . |
| 0385731 | 9/1990 | European Pat. Off. . |
| 479592 | 4/1992 | European Pat. Off. . |
| 1290717 | 3/1969 | Germany . |
| 3524631A1 | 1/1986 | Germany . |
| 3930350 | 3/1991 | Germany . |
| 51-119777 | 10/1976 | Japan . |

(List continued on next page.)

OTHER PUBLICATIONS

Properties Of Polymers Used in Hose Manufacture, Chapter 16, Hose Technology, Colin W. Evans, Publisher: Applied Science Publisher Ltd., Ripple Rd, Barking, Essex, Eng. (No Date).

Cefral Soft, Technical Data, Central Glass Co., Ltd.

Gas Plasma Technology and Its Applications, Stephen L. Kaplan and Robert Holland, Mar. 1987, Plasma Science, Belmont, Calif.

(List continued on next page.)

*Primary Examiner*—Charles Nold
*Attorney, Agent, or Firm*—Gifford, Krass, Groh, Sprinkle, Anderson & Citkowski, P.C.

[57] ABSTRACT

Described herein is a method of preparing a fluoropolymer composite comprising the steps of exposing a formed fluoropolymer substrate to a flame, then activating the fluoropolymer substrate by subjecting the substrate to a charged gaseous atmosphere formed by electrically ionizing a gas which contacts the substrate and thereafter applying a layer of a thermoplastic or thermoset polymer to the activated fluoropolymer substrate. The ionizing step can be described as a mixed gas plasma discharge or an electrically formed plasma. Also described herein are other methods of surface activation including exposure to excimer laser, gamma rays, x-ray flux, electron beam, sodium naphthalate bath, and others. In particular, described is a fuel pipe comprised of an inner fluorocarbon layer having electrostatic discharge resistance and hydrocarbon evaporative emission resistance chemically bonded to an outer layer of a thermoplastic or thermoset polymer. There is no need for additional adhesives. Fluoropolymer layers have excellent chemical resistance.

14 Claims, 5 Drawing Sheets

U.S. PATENT DOCUMENTS

| | | | |
|---|---|---|---|
| 3,473,087 | 10/1969 | Slade | 317/2 |
| 3,507,763 | 4/1970 | McBride | 204/169 |
| 3,539,443 | 11/1970 | Jackson | 161/186 |
| 3,676,181 | 7/1972 | Kowalewski | 117/47 |
| 3,907,955 | 9/1975 | Viennot | 264/105 |
| 4,011,121 | 3/1977 | Dioss | 156/82 |
| 4,035,534 | 7/1977 | Nyberg | 428/34.9 |
| 4,188,426 | 2/1980 | Auerbach | 204/169 |
| 4,259,408 | 3/1981 | Moschter | 428/424.6 |
| 4,272,585 | 6/1981 | Strassel | 428/413 |
| 4,293,663 | 10/1981 | Stivers | 525/187 |
| 4,311,745 | 1/1982 | Civardi | 428/91 |
| 4,330,017 | 5/1982 | Satoh et al. | 138/141 |
| 4,343,861 | 8/1982 | Stivers | 428/413 |
| 4,353,763 | 10/1982 | Simons | 156/184 |
| 4,358,559 | 11/1982 | Holcomb et al. | 524/380 |
| 4,383,131 | 5/1983 | Clabburn | 174/16.8 |
| 4,432,820 | 2/1984 | Thompson | 156/82 |
| 4,515,831 | 5/1985 | Wille | 427/223 |
| 4,564,662 | 1/1986 | Albin | 536/247 |
| 4,603,712 | 8/1986 | Krause | 138/137 |
| 4,622,237 | 11/1996 | Lori | 427/40 |
| 4,634,615 | 1/1987 | Versteegh et al. | 138/141 |
| 4,636,272 | 1/1987 | Riggs | 156/158 |
| 4,654,235 | 3/1987 | Effenberger et al. | 427/407.3 |
| 4,702,956 | 10/1987 | Wilson et al. | 428/251 |
| 4,718,568 | 1/1988 | Palü | 220/86 R |
| 4,731,156 | 3/1988 | Montmarquet | 156/643 |
| 4,743,327 | 5/1988 | DeHaan et al. | 156/272.6 |
| 4,748,204 | 5/1988 | Kawashima et al. | 525/72 |
| 4,749,610 | 6/1988 | Katsuragawa et al. | 428/228 |
| 4,758,455 | 7/1988 | Campbell et al. | 428/36 |
| 4,770,927 | 9/1988 | Effenberger et al. | 428/245 |
| 4,780,158 | 10/1988 | Thomas | 156/82 |
| 4,800,109 | 1/1989 | Washizu | 428/34.9 |
| 4,802,943 | 2/1989 | Gibbons et al. | 156/244.23 |
| 4,826,731 | 5/1989 | Wagner et al. | 428/422 |
| 4,871,406 | 10/1989 | Griffith | 156/82 |
| 4,887,647 | 12/1989 | Igarashi et al. | 138/126 |
| 4,898,638 | 2/1990 | Lugez | 156/272.6 |
| 4,933,060 | 6/1990 | Prohaska | 204/192.36 |
| 4,943,473 | 7/1990 | Sahatjian et al. | 428/245 |
| 4,995,028 | 2/1991 | Boling et al. | 369/275.5 |
| 5,008,340 | 4/1991 | Guerra et al. | 525/193 |
| 5,051,978 | 9/1991 | Mayer et al. | 369/275.5 |
| 5,056,512 | 10/1991 | Bower et al. | 128/201.25 |
| 5,059,480 | 10/1991 | Guerra et al. | 428/34.9 |
| 5,077,115 | 12/1991 | Arthur et al. | 428/137 |
| 5,081,326 | 1/1992 | Usui | 174/47 |
| 5,089,200 | 2/1992 | Chapman, Jr. et al. | 264/127 |
| 5,092,947 | 3/1992 | Halg et al. | 156/82 |
| 5,108,780 | 4/1992 | Pitt et al. | 156/272.6 |
| 5,114,510 | 5/1992 | Wright | 156/82 |
| 5,124,878 | 6/1992 | Martucci | 138/125 |
| 5,141,800 | 8/1992 | Effenberger et al. | 428/267 |
| 5,170,011 | 12/1992 | Martucci | 174/47 |
| 5,284,184 | 2/1994 | Noone | 138/121 |
| 5,296,510 | 3/1994 | Yamada et al. | 521/145 |
| 5,300,361 | 4/1994 | Vowinkel et all | 428/304.4 |
| 5,357,005 | 10/1994 | Buchwalter et al. | 156/272.6 |
| 5,500,257 | 3/1996 | Krause et al. | 427/487 |
| 5,554,425 | 9/1996 | Krause et al. | 428/36.91 |

FOREIGN PATENT DOCUMENTS

| | | |
|---|---|---|
| 53-58588 | 5/1978 | Japan . |
| 5733373 | 6/1979 | Japan . |
| 5738272 | 6/1979 | Japan . |
| 58-114979 | 8/1983 | Japan . |
| 58-201613 | 11/1983 | Japan . |
| 639533 | 2/1988 | Japan . |
| 1154755 | 6/1989 | Japan . |
| 1174442 | 7/1989 | Japan . |
| 63224943 | 7/1989 | Japan . |
| 2107371 | 4/1990 | Japan . |
| 62162542 | 8/1990 | Japan . |
| 3114829 | 5/1991 | Japan . |
| 2204932 | 11/1988 | United Kingdom . |

OTHER PUBLICATIONS

Plasma Treatment Upgrades Adhesion in Plastic Parts, Stephen L. Kaplan and Peter W. Rose, Plastics Engineering, May 1988, pp. 77–79.

Plasma–Sprayed Coatings, Herbert Herman, Scientific American, Sep. 1988, pp. 112–117.

Acheiving Optimum Bond Strength With Plasma Treatment, George P. Hansen et al., Society of Manufacturing Engineers, Sep. 1989, Paper No. AD 89–537.

"DuPont Announces Winners for 1993 Plunkett Awards for Innovation with 'Teflon'", DuPont News, DuPont External Affairs, Wilmington, Delaware, Mar. 1993.

Dyne–A–Mite™ Solves Adhesion Problems, Promotional brochure from Enercon Industries Corporation, Menomee Falls, Wisconsin. (No Date).

Ceramic Coatings: More Than Just Wear Resistant, Edward S. Hamel, ME, Aug. 1986, pp. 30–34.

"Pilot Industries Wins Top Plunkett Award," Plastics News, Wilmington, Delaware, Apr. 5, 1993, p. 8.

"'P–CAP' from Pilot Industries Inc. First Place Winner 1993 Plunkett Awards for Innovation with 'Teflon'," DuPont Background, DuPont.

External Affairs, Wilmington, Delaware.

"Pilot Industries Wins Top Award for Innovation," Pilot Industries Inc., Dexter, Michigan.

FLUOROPOLYMER COMPOSITE TUBE AND METHOD OF PREPARATION

CROSS REFERENCE TO RELATED APPLICATION

This is a Continuation-in-part of application Ser. No. 08/265,679 filed on Jun. 24, 1994, now U.S. Pat. No. 5,759,329 which is a continuation in part of Ser. No. 08/083,042 filed on Jun. 24, 1993 (abandoned), which is a continuation in part of Ser. No. 07/817,304 filed Jan. 6, 1992 (abandoned), and Ser. No. 08/403,499 filed Mar. 14, 1995, now U.S. Pat. No. 5,554,425 which is a division of Ser. No. 08/200,941 filed Feb. 23, 1994 (abandoned), which is a continuation of Ser. No. 07/817,304 filed Jan. 16, 1992 (abandoned).

BACKGROUND OF THE INVENTION

I. Field of the Invention

The invention pertains to the field of fluoropolymer hoses and tubes such as fluoropolymer composite pipes used in fuel lines.

II. Description of the Prior Art

With the advent of increased concern over evaporative fuel emission standards, there has been an increasing need for fuel lines that meet more stringent evaporative emission requirements, while at the same time having high chemical and electrostatic discharge resistance. Further, in order to be economical, any fuel line must be able to be produced in large quantities at a low cost. A desirable fuel line should have appropriate physical properties including, but not limited to, sufficient tensile strength and kink resistance, or the ability of the fuel line to retain a particular shape upon bending.

Fuel line hoses of a variety of materials have been suggested over the years. Tetrafluoroethylene has been utilized and has excellent and outstanding high temperature and chemical resistance. "Hose Technology," publisher: Applied Science Publisher, Ltd., Essex England, by: Colin W. Evans, pages 195–211. Nylon has also been utilized as a hose composition. However, fluorinated polymers are difficult to use because of the difficulty in adhering other materials to them in order to form desirable composites.

U.S. Pat. No. 4,933,060 discloses surface modification of fluoropolymers by reactive gas plasma. The reference, however, further indicates that in order to have sufficient bonding, adhesives must be utilized prior to the application of an additional layer. Suitable adhesives are epoxies, acrylates, urethanes, and the like.

U.S. Pat. No. 4,898,638 teaches a method of manufacturing flexible gaskets which withstand chemical agents. Flexible gaskets are prepared in which one film of PTFE (polytetrafluoroethylene) is directly applied onto a sheet of raw rubber and the sheet of rubber together with the film of PTFE is subjected to heating and pressure suitable for causing the rubber to vulcanize. Use of adhesives in the bonding of fluoropolymers is likewise described in U.S. Pat. No. 4,743,327, and their use is required to make the development operative. Activating fluoropolymers utilizing ammonia gas is taught in U.S. Pat. No. 4,731,156.

None of the prior art describes a fluoropolymer with a layer of a thermoset or thermoplastic polymer that is integral with and chemically bonded to the fluoropolymer, which when combined in a multi-layered composite hose or pipe, has desirable electrostatic discharge resistance, hydrocarbon evaporative emission resistance, and flexibility. Further, the prior art suggests the need for adhesives to firmly and fixedly join plastic layers. This invention does not have as an essential requirement that additional adhesives are needed in joining the fluoropolymer layer to the thermoset or thermoplastic polymer layer because the layers are chemically bonded to each other.

Polymer surfaces typically lack the irregular structure necessary to achieve an effective mechanical bond. Therefore, methods such as etching or scuffing have been used to physically "roughen" the substrate surface. This invention however, by incorporating a chemical bond, does not require this mechanical alteration of the surface. It can be shown through various microscopic techniques (i.e. SEM) that no significant changes occur to the physical structure of the fluoropolymer substrate surface by the various means of surface activation employed in this invention such as exposure to a charged gaseous atmosphere, a sodium naphthalate bath, or a laser. Furthermore, bonding has been achieved by these methods with materials such as thermoset elastomers which typically do not have processing viscosities sufficiently low to achieve adequate bond strength strictly by mechanical means.

It is an object of the present invention to have a fuel pipe or tube that has a fluoropolymer substrate that can be activated sufficiently to be able to have an integral and chemically bonded top coat or layer of a thermoset or thermoplastic polymer.

It is also an object of the present invention to prepare a fluoropolymer composite by extruding a multi-layered fluoropolymer substrate, one layer of which has desirable chemical, permeation, and electrostatic discharge resistance, and on top of the fluoropolymer layers would be an extruded thermoset or thermoplastic polymer layer.

SUMMARY OF THE PRESENT INVENTION

The present invention is concerned with a method of preparing a fluoropolymer composite tube comprising the steps of:

(1) forming a fluoropolymer substrate;
(2) activating a surface of the fluoropolymer substrate;
(3) and thereafter applying a layer of a polymer selected from the group consisting of thermoset polymers and thermoplastic polymers to the activated fluoropolymer such that there exist chemical bonds between the layers.

The fluoropolymer substrate can be activated in a number of ways such as subjecting the substrate to a charged gaseous atmosphere formed by electrically ionizing a gas which contacts the substrate, bathing the substrate in a sodium naphthalate bath, and exposing the substrate to a high-energy laser. Other means of activation which are known in the art may also be utilized, surface activation being broadly defined to mean those methods which have the affect of altering the electronic states of the surface of the fluoropolymer substrate without mechanically altering the surface. Mechanical alteration would include etching or scuffing the surface. Also, the thermoset or thermoplastic polymer can optionally contain a curing agent. Both the activation of the fluoropolymer layer and the addition of a curing agent to the thermoset or thermoplastic polymer layer serve to increase the strength of the chemical bonds between the layers.

The invention is also directed to a fuel pipe comprised of an inner fluorocarbon layer having electrostatic discharge resistance and hydrocarbon evaporative emission resistance, and on top of and integral with the fluorocarbon layer is an outer layer of a thermoset or thermoplastic polymer layer chemically bonded to the fluorocarbon layer.

BRIEF DESCRIPTION OF THE DRAWINGS

A better understanding of the present invention will be had upon reference to the following detailed description, when read in conjunction with the accompanying drawings, wherein like reference characters refer to like parts throughout the several views, and in which.

DETAILED DESCRIPTION OF PREFERRED EMBODIMENTS OF THE PRESENT INVENTION

Figure 1:
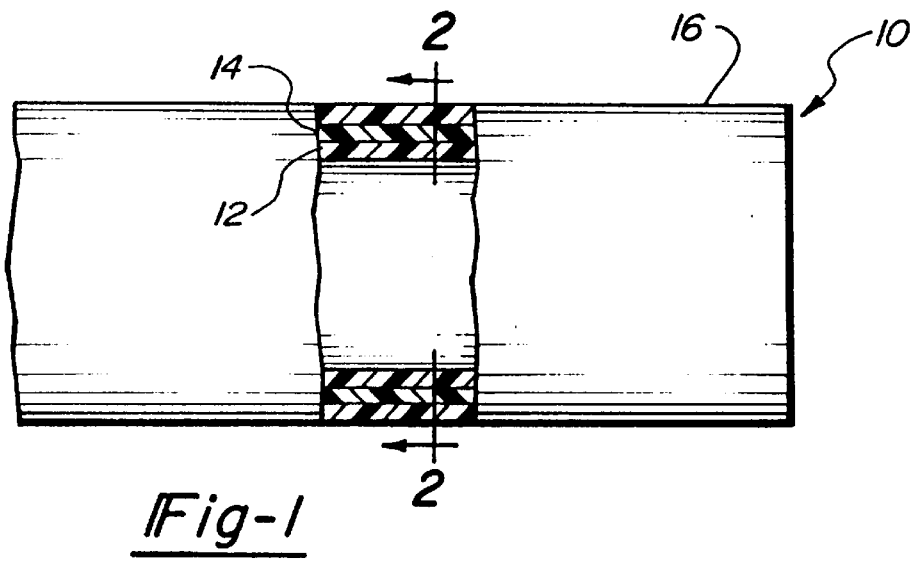
FIG. 1 is a side sectional view of the three-layered fuel pipe of the resent invention.

The present invention is directed to a method of preparing a fluoropolymer composite such as a pipe or tube. In particular, it is preferred that the fluoropolymer be a multi-layered fluoropolymer. It is preferred that the inner fluoropolymer layer have electrostatic discharge resistance and the entire fluoropolymer layer have hydrocarbon evaporative emission resistance. The electrostatic discharge resistance is obtained preferably by making the fluoropolymer layer a conductive fluoropolymer. In this fashion, the electrostatic charge (electricity) that may be generated during the flow of fuel or other fluids through the pipe or tube can be carried to ground.

The composite tube of the present invention may have multiple layers without the presence of a conductive filler. Due to the need of having on board the vehicle a refueling vapor recovery system, it may be desirable to have a layer (or layers) of fluorocarbon polymer surrounded by a thermoset or thermoplastic polymer. In this manner, the fuel vapor alone can travel through the composite tube to any desirable location in the vehicle, e.g. an on-board carbonaceous containing canister. The carbon material can absorb the fuel vapors.

The polymers, e.g. fluoropolymers, that may be utilized are any of the available fluoropolymers, many of which are commercially available. Suitable fluoropolymers include, but are not limited to, ethylene-tetrafluoroethylene (ETFE), ethylene-chlorotrifluoroethylene (ECTFE), fluorinated ethylenepropylene (FEP), perfluoroalkoxy (PFA), polyvinylfluoride (PVF), polyvinylidene fluoride (PVDF), tetrafluoroethylene-hexafluoropropylene-vinylidenefluoride (THV), polychlorotrifluoroethylene (PCTFE), polytetrafluoroethylene (PTFE). Other fluoropolymers are those that are prepared from perfluorinated α-fluoroolefin monomers containing hydrogen atoms as well as fluorine atoms. The α-fluoroolefin has 2–6 carbon atoms. Typical α-fluoroolefins may be perfluorinated as hexafluoropropene, perfluorobutene, perfluoroisobutene, and the like; as hydrogen-containing α-fluoroolefins such as trifluoroethylene, vinylidene fluoride, vinyl fluoride, pentafluoropropane, and the like; as halogen-containing α-fluoroolefins such as trifluorochloroethylene, 1,1-difluoro-2,2 dichloroethylene, 1,2-difluoro-1,2 dichloroethylene, trifluorobromoethylene and the like; and as perfluoroalkoxyethylene polymers. The most preferred fluoropolymer is ETFE sold under the trademark Tefzel® (trademark of DuPont).

The layer of fluoropolymer that is to be conductive in order to carry away the electrostatic discharge can generally be made conductive in a well known manner. This conductivity can occur by adding conductive particles to the fluoropolymer resin prior to processing. The electrically conductive particles incorporated into fluoropolymers are described in U.S. Pat. No. 3,473,087, hereby incorporated by reference. Suitable conducting materials would be carbon black in the amount of 0.1–10 weight percent of the total fluoropolymer layer, preferably 0.1–2 weight percent. The carbon black is blended with the fluoropolymer prior to the extrusion step. Conductive fluoropolymer resin is likewise commercially available.

It is preferred that the fluorinated polymer be extruded by a melt extrusion technique where the first layer would be a conductive fluoropolymer and co-extruded with it would be the second layer on top of the first layer, wherein the second layer is a fluoropolymer without the conducting particles therein.

On top of the fluoropolymer layer, integral with it, and chemically bonded to the fluoropolymer layer is an extruded thermoset or thermoplastic polymer material. The thermoset or thermoplastic polymer material can be a variety of materials. Suitable materials would be those that can be extruded on top of the extruded fluoropolymer pipe or tube. Suitable thermosets include, but are not limited to, amide urethane elastomers, chlorinated polyethylene, chloroprene, chlorosulfonated polyethylene, copolyether ester, epichlorohydrin, ethylene acrylic, ethylene propylene, fluoroelastomer, perfluoroelastomer, fluorosilicone, hydrocarbon elastomers, hydrogenated nitrile butyl, isobutylene isoprene, isoprene, nitrile, polyacrylate, polybutadiene, polyester urethane, polyether urethane, polynorborene, polysulfide, polyurethanes, propylene oxide, silicone, styrene butadiene, styrenic elastomer, and thermoplastic elastomers. The most preferred thermoset polymer is VAMAC® ethylene/acrylic elastomer (trademark of DuPont), a copolymer of ethylene and methyl acrylate plus a cure site monomer.

Suitable thermoplastics include, but are not limited to, acrylate materials, polyester materials, bromoisobutene-isoprene materials, polybutadiene, chlorinated butyl rubber, chlorinated polyethylene, polychloromethyloxirane, chloroprene, chlorosulphonyl-polyethylene, ethyleneoxide and chloromethyloxirane polymer. Also included are ethylenepropylenedieneterpolymer, ethylenepropylenecopolymer, polyetherurethanes, isoprene, isobutene isoprene, nitrile butadiene, polyamide, polyvinylchloride, styrenebutadiene, polysulfide, polyolefins, polyphenylsulfides and polysulfones (e.g. Astrel, a trademark of 3M, polyether sulfone of ICI and Udel, a trademark of Union Carbide). Most preferably, a polyamide is employed, and even more preferably, a nylon such as nylon 66 which is a condensation product of adipic acid and hexamethylenediamine, nylon 6 which is a polymer of caprolactam, nylon 4 which is a polymer of butyrolactam (2-pyrrolidone), nylon 2 made from butadiene, and the like. The most preferred nylon is the nylon 12 available under the trademark of L25 FVS 40 from EMS of Switzerland.

In the melt extruding process for the formation of polyfluoropolymer layers, the extrusion temperature that is utilized ranges from about 500 to about 800° F., preferably about 550–700° F., with the screw revolutions per minute (RPM) ranging from about 1 to about 100 RPM, preferably 5–50 RPM.

Cross-linking and adhesion of the layers can occur through a number of extrusion techniques. One method utilizes an autoclave amine cure system, with temperature and pressure at 320° F. and 80 PSI, respectively. Another method utilizes a continuous autoclave and salt bath with temperature and pressure at 400–500° F. and 1 atm, respectively. Still other methods can also be used.

Figure 2:
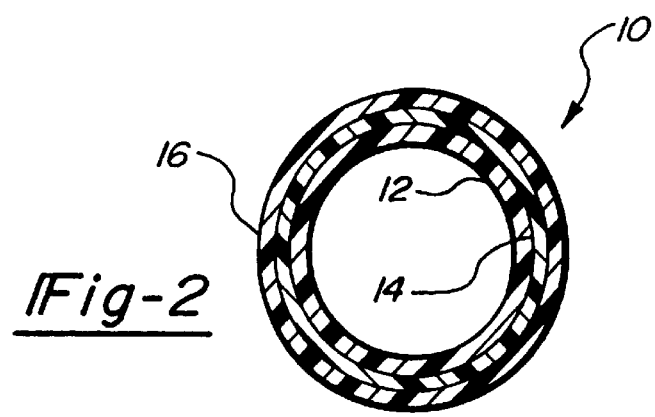
FIG. 2 is a cross-sectional view of FIG. 1 along lines 2—2.

The end product that is produced is the multi-layered fluoropolymer having a thermoset or thermoplastic polymer material 16 chemically bonded on top 10 as shown in FIGS. 1 and 2. The conductive layer 12 is co-extruded with the non-conductive layer 14. The conductive particles (not shown) are present in the layer 12.

When conductivity in the fluoropolymer layer is not desired, then the same non-conductive fluoropolymer is co-extruded to form the multiple layers. Obviously, one may desire only one fluoropolymer layer, in which case, a single extrusion die could be used. Thereafter, the additional processing steps are followed.

Additionally, a braided reinforcing material can be placed between the layers to provide added strength to the tube. This reinforcing material may be layered in between the fluoropolymer layer and the thermoset or thermoplastic polymer layer, or in a preferred embodiment, may be layered on top of the composite tube, with an added layer of the thermoset or thermoplastic polymer on top.

Prior to the extruding of the top thermoset or thermoplastic polymer layer 10, the fluoropolymer should be electronically activated. In other words, the outer portion of layer 14 which is to come into contact with the layer 10 should have its surface treated in such a way so as to electronically activate the fluoropolymer surface. "Electronic activation," as used herein, refers to a process which creates activated electronic states at the surface of the fluoropolymer. These states may comprise broken, bent, strained or dangling bonds between the atoms comprising the fluoropolymer surface. Likewise, electronically activated states may comprise free radicals, or chemical bonds which, while not broken, are in a high energy state. It will be appreciated that the electronically activated surface of the fluoropolymer facilitates the formation of chemical bonds between the fluoropolymer and subsequently applied bodies of material. Within the context of this disclosure "chemical bonds" are defined to include covalent and ionic bonds as well as those other bonds created by electronic or electrostatic attraction such as by Van der Waal's forces. Such other bonds may include pi bonds, hydrogen bonds, electrostatic bonds or the like. By the creation of electronically activated surface states on the body of fluoropolymer, a subsequent layer of polymer may be bonded thereto without the need for adhesives or mechanical treatment of the surface.

It is generally desirable to eliminate processing steps requiring mechanical abrasion or like treatments of the substrate, since such treatments can damage or weaken the fluoropolymer, leading to early failure of fuel lines made therefrom. Also mechanical treatments generally require the use, and associated maintenance of fairly precise equipment. Likewise, it is generally desirable to avoid the costs and equipment associated with adhesive based processes.

In one embodiment, the fluoropolymer layer 14 is subjected to a charged gaseous atmosphere that is formed by electrically ionizing a gas which contacts the substrate 14. It is most preferred that the plasma impinge upon 360° of the fluoropolymer tube. In other words, there is a first stage mixed gas plasma electrode discharge where approximately 270° of the tube is subjected to the mixed gas plasma discharge. The tube is anywhere from about 0.05 to 3 inches, preferably 0.1 to 0.5 inches from the electrode as the tube passes through the mixed gas plasma electrode discharge. Thereafter, within approximately 3 inches to 3 feet, preferably 6 inches to 18 inches from the first mixed gas plasma discharge device, the tube comes in contact with a second stage mixed gas plasma discharge placed on the opposite side from the first side, where again the tube is subjected to approximately a 270° contact around the tube with the mixed gas plasma discharge. In this fashion, the entire circumference of 360° of the tube is subjected to activation by mixed gas plasma discharge.

Any conventional mixed gas plasma discharge equipment can be used. One such device is available from Enercon Dyne-A-Mite, Model B12, which uses an air blown electrical arc to form the mixed gas treatment plasma. In other words, there are four separate mixed gas plasma discharge heads making up four separate stages which are in the open air, at ambient temperature and pressure. Each mixed gas plasma discharge head of the Enercon device, each trapezoidal in shape, has a pair of wire electrodes (0.065 inches diameter) in the same horizontal plane separated by a gap of 0.35 inches with an overall length from the end of one wire electrode to the end of the second wire electrode of 1.9 inches.

It is to be appreciated that the open air and open atmosphere is the most preferred economical approach for mixed gas plasma discharge. It is to be appreciated further that depending upon the amount of activation that is required and the particular materials that are to be applied to the fluoropolymer, closed chamber electrode discharge devices could be utilized. In a closed chamber environment, a pair of oppositely charged (positive and negative electrodes) may be utilized by passing a current therebetween, thereby ionizing a gas. The substrate can pass through the electric field which has ionized the gas. This gas may be altered by supplying additional gases to the chamber such as oxygen, nitrogen or other reactive gases such as carbon monoxide, fluorinated gases, carbon dioxide, hydrogen fluoride, carbon tetrafluoride, ammonia, and the like. The chamber may be operated at vacuum pressure such as from 0.01 to 100 torr (1 atmosphere equals 760 torr).

A coextrusion die (FIG. 21) is used for high production rates. Therefore, the extruded tube as it passes through the mixed gas plasma discharge stage moves at a high constant rate. Preferably, the rate is from 1 to 150 linear feet per minute (FPM), preferably 15 to 60 FPM. The Enercon device has a treatment area for the mixed gas plasma discharge with a size of about 2½ inches by 2 inches per head.

When the Enercon Dyne-A-Mite mixed gas plasma discharge device is utilized, the activated tube is not significantly hot to the touch, but is perhaps 10 or 20° F. over ambient temperature. This increases the safety in manufacturing the fuel tube or pipe.

The Enercon device is preferably operated at an output of 15,000 volts with 30 milliamps plasma per electrode with 2 electrode stages being employed.

The wattage that is applied to the electrodes in order to ionize the gas can vary substantially. For example, the wattage may vary from 250 joules/sec to 600 joules/sec when the tube being treated is moving about 25 sq. inches/min. (assuming 1 inch outer diameter tube, 12 inches long), i.e. about 10 to 24 joules per linear foot of tube.

In an alternate embodiment, the fluoropolymer surface can be exposed to a flame prior to activation by treatment with a mixed gas plasma. Flame exposure prior to activation can serve to increase the bond strength between the fluoropolymer and thermoset or thermoplastic polymer layers. In one embodiment, the fluoropolymer surface is exposed to a propane torch flame just prior to mixed gas plasma treatment.

Other means of electronic activation, in addition to the mixed gas plasma process, can also be utilized to create surface states on the fluoropolymer. For example, in an alternate embodiment, the fluoropolymer substrate can be immersed in a chemical bath. For example, the polymer may be immersed in a sodium naphthalate bath. The sodium naphthalate may be complexed or uncomplexed. Thereafter, the fluoropolymer is immersed in a washing bath, preferably an alcohol-water wash bath. Such chemical treatment will create an electronically activated surface. In yet another alternate embodiment, the fluoropolymer surface is electronically activated by being exposed to a high-energy, UV laser, such as an excimer laser. In other instances, activation of surface electronic states may be accomplished by bombarding the surface with x-rays or gamma rays, or with an electron beam. Still other means of activating the surface of the fluoropolymer substrate can be utilized, such as any method which has the affect of altering the molecular states of the fluoropolymer surface, without mechanically altering the surface, such as by pitting or grooving the fluoropolymer substrate. Flame treatment of the fluoropolymer surface prior to the activation step, as has been previously described, can also be used in conjunction with these other means of electronic activation.

Figure 3:
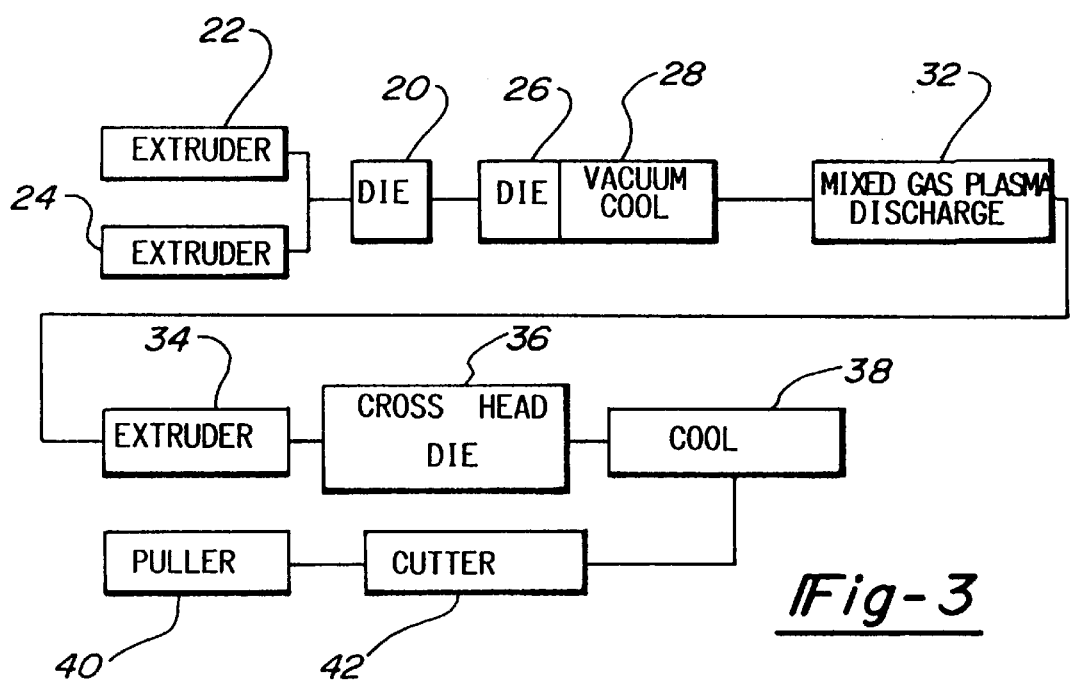
FIG. 3 is a schematic diagram of the process for the method of preparing the fuel pipe of the present invention.
Figure 21:
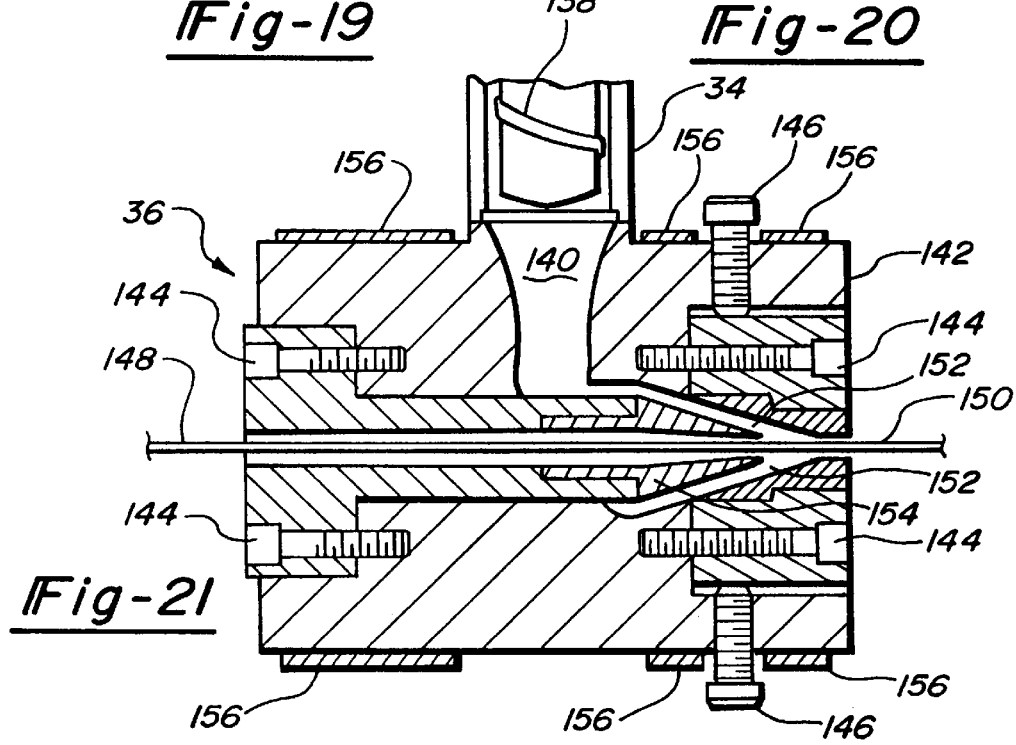
FIG. 21 is a cross-sectional view of the cross-head die as schematically shown in FIG. 3.

After the activation of the surface of the fluorinated tube, the thermoset or thermoplastic polymer is extruded through the cross-head die as shown in FIG. 21 and schematically in FIG. 3. If the outer polymer material does not already contain a curing agent, then a curing agent may be added prior to layering on top of the fluoropolymer. Just as with the flame exposure step, the addition of the curing agent serves to increase the strength of the chemical bonds between the layers. The cross-head die is at an extrusion temperature sufficient to soften the thermoplastic or polymer thermoset material. Generally, the temperature is significantly less than the extrusion temperature of the fluorinated plastic. The operative temperature for the cross-head die would range from about 100 to about 500° F., preferably 120 to about 200° F., with screw rotations per minute (RPM) of 10 to 100 RPM, preferably 20 to 60 RPM, with a line speed of approximately 5 to 100 feet per minute, preferably 15 to 70 feet per minute.

By electronically activating the surface of the fluoropolymer substrates by methods such as exposure to a charged gaseous atmosphere, sodium naphthalate bath, or a high-energy source, various functional groups such as carbonyl, carboxyl, hydroxyl groups and others may readily bond to the molecular structure of the fluoropolymer substrate surface. These groups can provide sites for potential chemical bonding with other materials by way of secondary interactions such as hydrogen bonding, van der Waal's interactions, and others. These interactions may occur between the activated states on the surface of the substrate and groups present in the molecular make-up of the applied polymer layer, or between the activated states and additives contained within the applied polymer layer (such as curing agents). These interactions achieve a chemical bond between the substrate and second layer. For example, many thermosetting materials such as ethylene-acrylic elastomer (VAMAC®) may utilize amine curing agents such as triethylene tetramine, which, along with ethylene-acrylic elastomer (VAMAC®) are capable of forming hydrogen bonds with the activated fluoropolymer substrate surface. Other substitutes such as nylons and urethanes already have functional groups present in their molecular structure such that additional curing agents are unnecessary in order to effect this chemical bonding with the activated fluoropolymer surface.

There may also exist the possibility to form covalent chemical bonds to the activated fluoropolymer substrate surface. For example, curing agents such as amines react with carboxyl curing sites of a neat polymer matrix to form amide crosslinks. Similarly, curing agents or functional groups present at the interface may react with chemical groups in the substrate surface forming covalent bonds to the substrate. These linkages may further react to the applied thermoset or thermoplastic polymer layer.

Turning now to a description of the drawings, FIG. 1 is a side sectional view of a three-layered fuel pipe. A two-layered pipe may also be utilized in which there is a single, rather than double, fluoropolymer layer. FIG. 2 is a cross-sectional view of a three-layered pipe. Again, a two-layered pipe may also be utilized. The schematic diagram of FIG. 3 indicates that coextrusion takes place in the coextrusion die 20 from extruders 22 and 24. After the formed tube leaves die 20, it then enters into die 26 which is in the entrance-way to the vacuum water-cooled chamber 28. The temperature of the water is room temperature. The tube is then exposed to the activation step 32 schematically show in FIG. 3. Thereafter, the activated fluoropolymer substrate is subjected to an extrusion of a thermoset or thermoplastic polymer from extruder 34. The fluoropolymer inner layer passes through a cross-head die for sizing at reference numeral 36. Thereafter the composite tube is cooled by vacuum cooler 38. The tube is pulled axially through the vacuum cooler by puller 40 and thereafter is cut by cutter 42 to the desired size.

Figure 4:
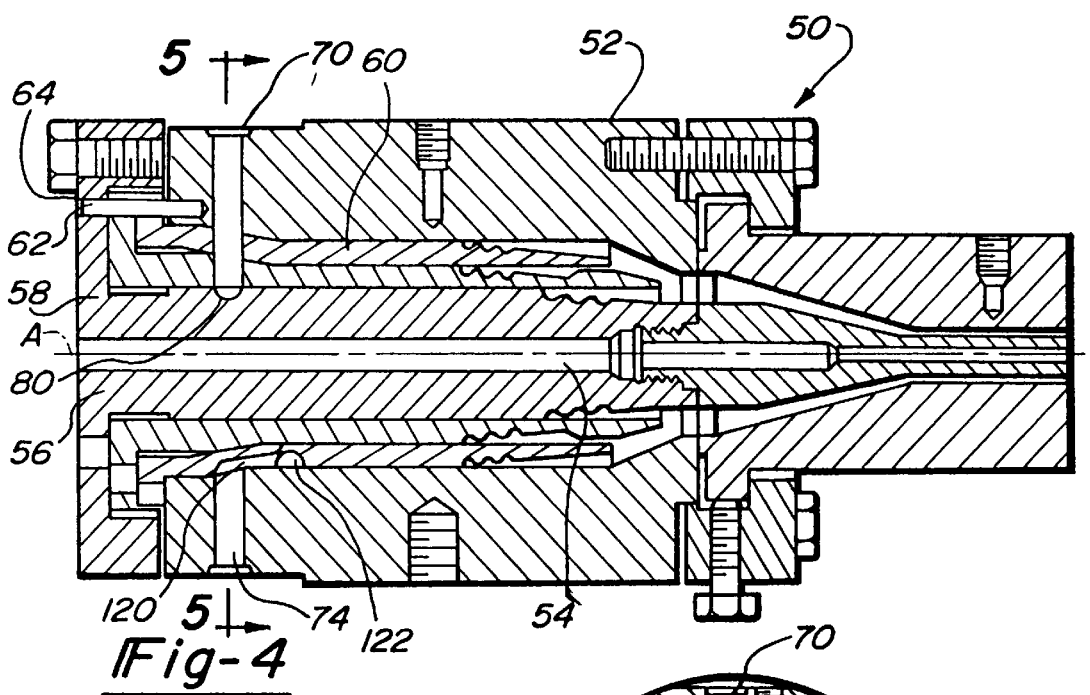
FIG. 4 is a cross-sectional view of the multi-inlet extrusion die used the method of preparing the fuel pipe of the present invention.

The operation of the die will now be described. While FIG. 4 shows three inlet lines, it is most preferred that a two inlet coextrusion die be utilized when two coextruded layers of fluorinated polymers are prepared, one being the conductive layer and the other being a non-conductive layer. Obviously, if only a single layer of fluoropolymer is used, a commercially available tube-forming extrusion die can be used.

The die assembly 50 shown in FIG. 4 includes a die housing 52 having an inner die member 56, a center die member 58 and an outer die member 60 as the main structural members. The die members 56, 58 and 60 are concentric and generally cylindrically-shaped extrusion die members. Throughbore 54 extends along axis "A" of the die assembly 50. The die members 56, 58 and 60 are held together by a bolt or pin 62 or the like which extends through the orifice 64.

Figure 5:
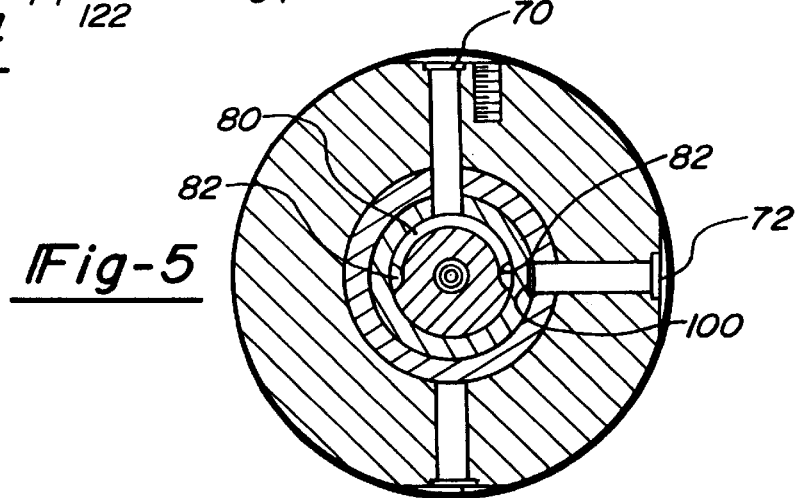
FIG. 5 is a cross-sectional view taken along the lines 5—5 of FIG. 4.

With additional reference to FIG. 5, in the preferred embodiment, the extrusion die members 56, 58 and 60 have inlets 70, 72 and 74, respectively, extending inwardly from the outer periphery of the die housing 50 to the associated die member. As best shown in FIG. 5, the inlet 70 preferably extends to a semi-circumferential distribution channel 80, through which extrusion material is passed for distribution to the extrusion end 76 of the die assembly 50, as described in greater detail herein below.

Figure 10:
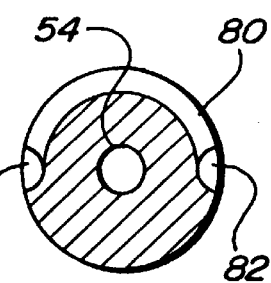
FIG. 10 is a cross-sectional view taken along the lines 10—10 of FIG. 6.

As best shown in FIG. 10, the distribution channel 80 is in fluid communication with a pair of axial distribution channels 82. As illustrated, the axial distribution channels 82 are preferably disposed symmetrically around the inner die member 56 and extend therealong toward the extrusion end 76.

Figure 6:
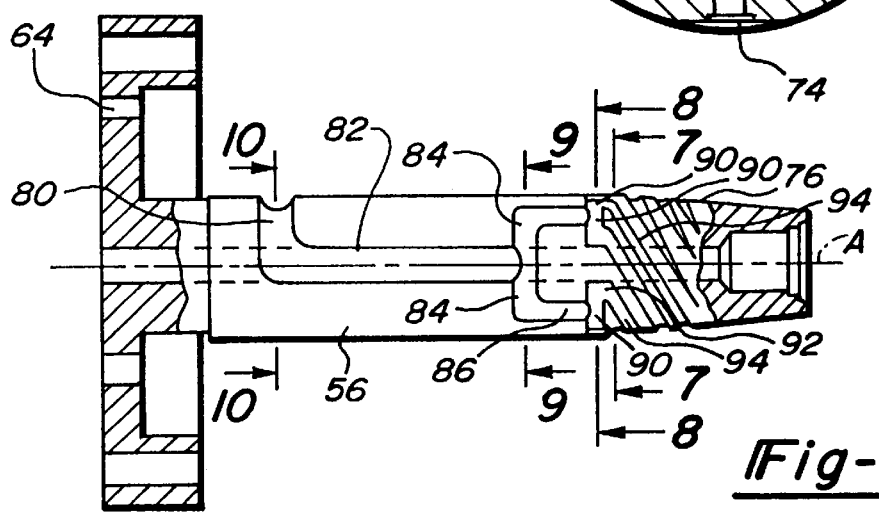
FIG. 6 is a cross-sectional view of the interior of the multi-inlet extrusion die taken along the lines 6—6 of FIG. 7.
Figure 7:
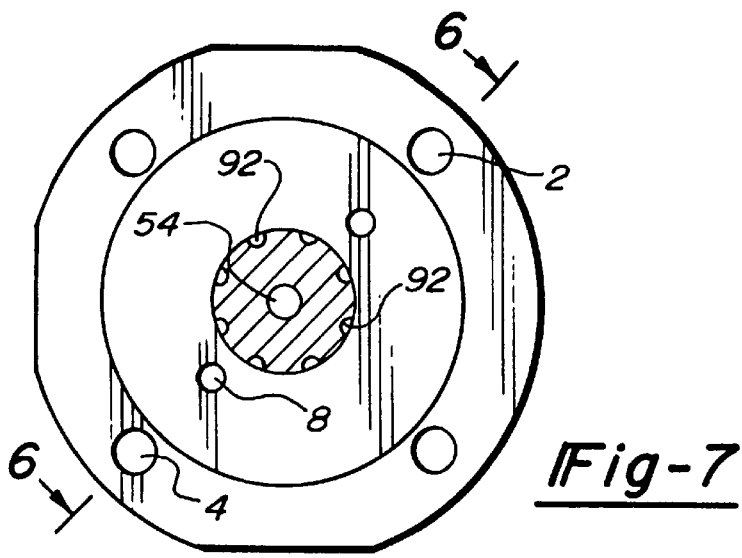
FIG. 7 is a cross-sectional view taken along the lines of 7—7 of FIG. 6.
Figure 9:
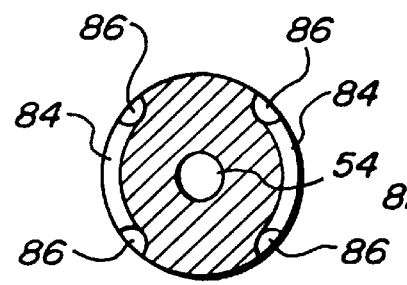
FIG. 9 is a cross-sectional view taken along the lines 9—9 of FIG. 6.

Referring now to FIG. 6 and FIG. 9, there is shown cross-sections of the inner die member 56. Each axial distribution channel 82 is in fluid communication with a pair of branch distribution channels 84. As illustrated, the branch distribution channels 84 extend around the inner die member 56 in a generally semi-circumferential manner. The branch distribution channels 84 are in fluid communication with four (4) axial distribution channels 86.

Figure 8:
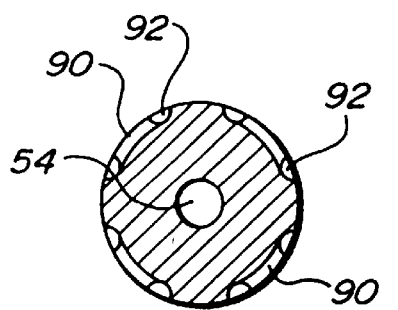
FIG. 8 is a cross-sectional view taken along the lines 8—8 of FIG. 6.

With reference to FIG. 6, the axial distribution channels 86 extend along axis "A" of the inner die member 56 toward the extrusion end 76. The channels 86 are in fluid communication with a plurality of branch distribution channels 90, which extend around the inner die member 56 in a partial circumferential manner, as best shown in FIG. 8. In the preferred embodiment, the distribution channels 90 are in fluid communication with eight (8) axial distribution channels 92 (only four of which are specifically illustrated in FIG. 6), which also extend along axis "A" toward the extrusion end 76. As shown in FIG. 6, the axial distribution channels 92 are in fluid communication with a plurality of generally screw-shaped channels 94 disposed around the extrusion end 76 in a spiral manner.

Thus, extrusion material enters the inlet 70 and travels to the inner die member 56. At semi-circumferential distribution channel 80, the extrusion material splits and enters the axial distribution channels 82. The material travels along the channels 82 and splits again at the branch distribution channels 84. The extrusion material then enters the axial distribution channels 86 and travels therealong to the branch distribution channels 90, where the material splits again and enters the eight axial distribution channels 92. From the channels 92, the extrusion material enters the screw-shaped channels 94. These screw-shaped channels 94 function to provide even distribution and good uniformity of the extrusion material during the extrusion process.

Figure 11:
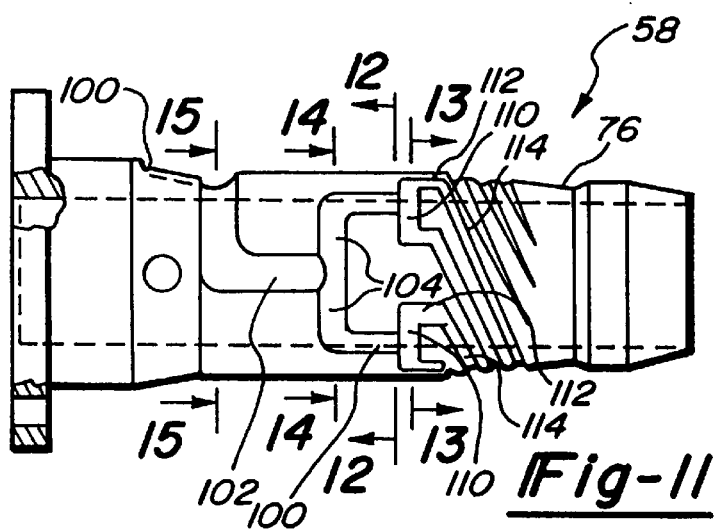
FIG. 11 is a cross-sectional view of the center extrusion die that is a part of the multi-inlet extrusion die of FIG. 4.
Figure 12:
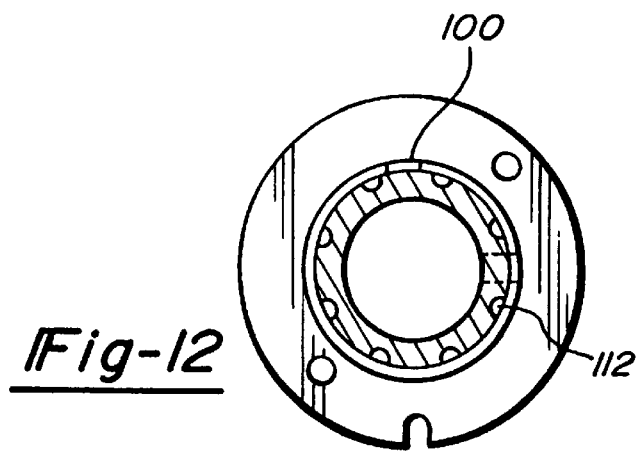
FIG. 12 is a cross-sectional view taken along the lines 12—12 of FIG. 11.
Figure 15:
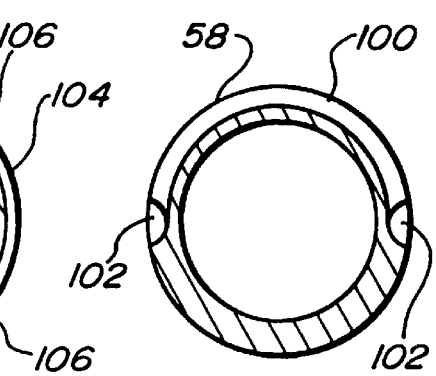
FIG. 15 is a cross-sectional view taken along the lines 15—15 of FIG. 11.

Referring now to FIGS. 11 and 15, there are shown various cross-sections of the center die member 58. Extrusion material enters the center die member 58 through the inlet 72 (as best shown in FIG. 1). The inlet 72 preferably extends to a semi-circumferential distribution channel 100, through which extrusion material is passed for distribution to the extrusion end 76', as described in greater detail herein below.

Figure 14:
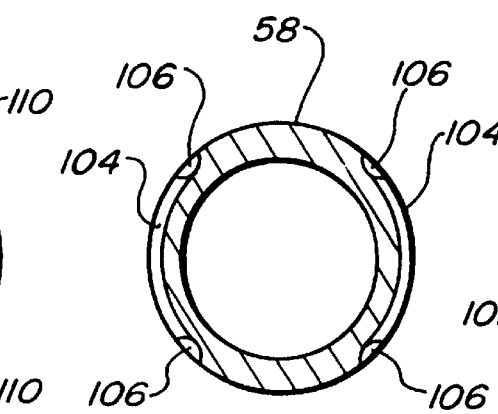
FIG. 14 is a cross-sectional view taken along the lines 14—14 of FIG. 11.

As best shown in FIG. 15, the distribution channel 100 is in fluid communication with a pair of axial distribution channels 102. As illustrated, the axial distribution channels 102 are preferably disposed symmetrically around the center die member 58 and extend therealong toward the extrusion end 76'. In the preferred embodiment, each axial distribution channel 102 is in fluid communication with a branch distribution channel 104. As best shown in FIG. 14, the branch distribution channels 104 extend around the center die member 58 in a generally semi-circumferential manner. The channels 104 are in fluid communication with four (4) axial distribution channels 106.

Figure 13:
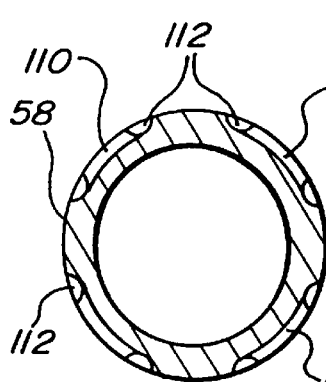
FIG. 13 is a cross-sectional view taken along the lines 13—13 of FIG. 11.

With continuing reference to FIG. 11, the axial distribution channels 106 extend along the center die member 58 toward the extrusion end 76'. The channels 106 are in fluid communication with a plurality of branch distribution channels 110, which extend around the center die member 58 in a partial circumferential manner, as best shown in FIG. 13. In the preferred embodiment, the distribution channels 110 are in fluid communication with eight (8) axial distribution channels 112 (only four of which are specifically illustrated in FIG. 11), which also extend along the member 58 toward the extrusion end 76'. As shown in FIG. 11, the axial distribution channels 112 are in fluid communication with a plurality of generally screw-shaped channels 114 disposed around the extrusion end 76' in a spiral manner.

In operation, extrusion material enters the inlet 72 and travels to the center die member 58. At semi-circumferential distribution channel 100, the extrusion material splits and enters the axial distribution channels 102. The material travels along the channels 102 and splits again at the branch distribution channels 104. The extrusion material then enters the axial distribution channels 106 and travels therealong to the branch distribution channels 110, where the material splits again and enters the eight axial distribution channels 112. From the distribution channels 112, the extrusion material enters the screw-shaped channels 114. As with the inner die member, these screw-shaped channels 114 therefore function to provide even distribution and good uniformity of the extrusion material during the extrusion process.

As shown in FIGS. 4 and 5, extrusion material enters the outer die member 60 through the inlet 74. Referring now to FIGS. 16 through 20, there are shown various cross-sections of the outer die member 60. The inlet 74 preferably extends to a trough 120, which is connected to a generally semi-circumferential distribution channel 122, through which extrusion material is passed for distribution to the extrusion end 76", as described in greater detail herein below.

Figure 16:
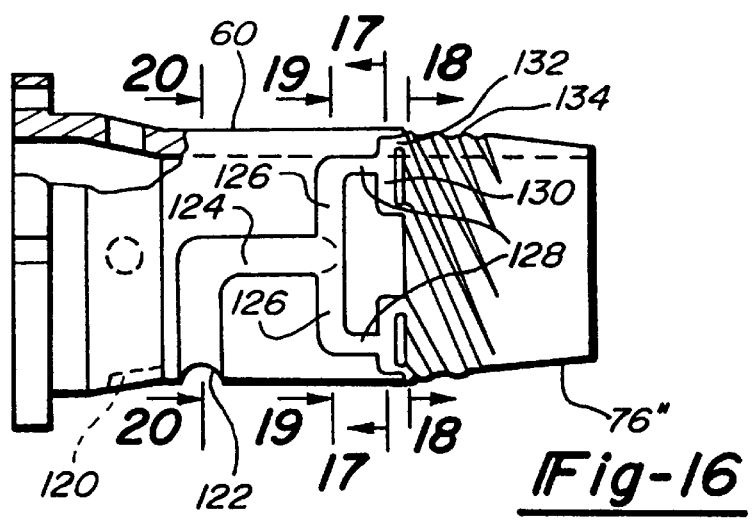
FIG. 16 is a cross-sectional view of the outer extrusion die which is a portion of the coextrusion multi-inlet die of FIG. 4.
Figure 17:
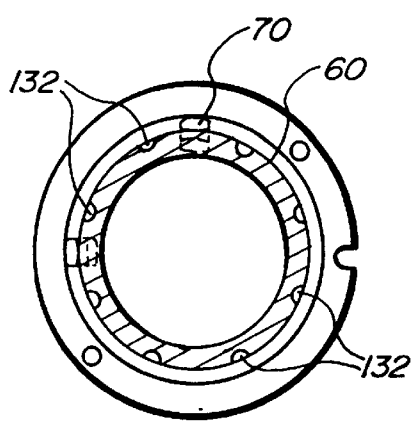
FIG. 17 is a cross-sectional view taken along the lines 17—17 of FIG. 16.
Figure 19:
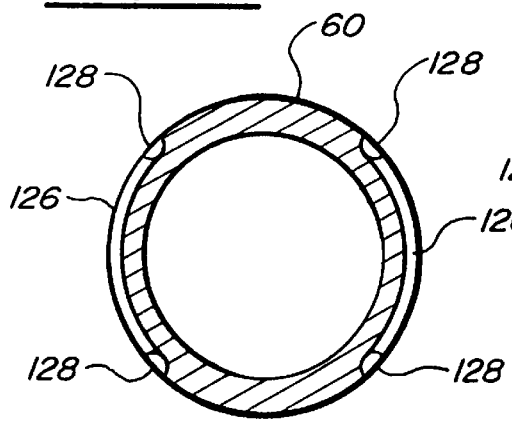
FIG. 19 is a cross-sectional view taken along the lines 19—19 of FIG. 16.
Figure 20:
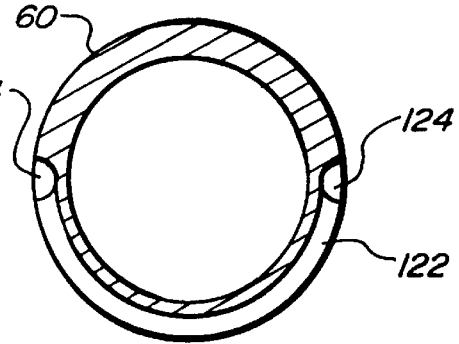
FIG. 20 is a cross-sectional view taken along the lines 20—20 of FIG. 16.

With combined reference to FIG. 16 and FIG. 20, the distribution channel 122 is preferably in fluid communication with a pair of axial distribution channels 124 (only one of which is shown in FIG. 16). As illustrated, the axial distribution channels 124 are preferably disposed symmetrically around the outer die member 60 and extend therealong toward the extrusion end 76". In the preferred embodiment, each axial distribution channel 124 is in fluid communication with a branch distribution channel 126. As best shown in FIG. 19, the branch distribution channels 126 extend around the outer die member 60 in a generally semi-circumferential manner. The branch distribution channels 126 are in fluid communication with four (4) axial distribution channels 128.

Figure 18:
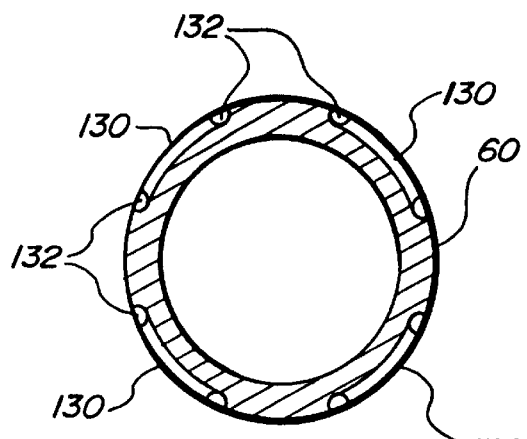
FIG. 18 is a cross-sectional view taken along the lines 18—18 of FIG. 16.

With continuing reference to FIG. 16, the axial distribution channels 128 extend along the outer die member 60 toward the extrusion end 76". The channels 128 are in fluid communication with a plurality of branch distribution channels 130, which extend around the outer die member 60 in a partial circumferential manner, as best shown in FIG. 18. In the preferred embodiment, the distribution channels 130 are in fluid communication with eight (8) axial distribution channels 132 (only four of which are specifically illustrated in FIG. 16), which also extend along the die member 60 toward the extrusion end 76". As shown in FIG. 16, the axial distribution channels 132 are in fluid communication with a plurality of generally screw-shaped channels 134 disposed around the extrusion end 76" in a spiral manner.

In operation, extrusion material enters the inlet 74 and travels to the trough 120 of the outer die member 60. At semi-circumferential distribution channel 122, the extrusion material splits and enters the axial distribution channels 124. The material travels along the channels 124 and splits again at the branch distribution channels 126. The extrusion material then enters the axial distribution channels 128 and travels therealong to the branch distribution channels 130, where the material splits again and enters the eight axial distribution channels 132. From the distribution channels 132, the extrusion material enters the screw-shaped channels 134. As with the inner and center die members, these screw-shaped channels 134 therefore function to provide good distribution and uniformity of the extrusion material during the extrusion process.

FIG. 21 is a cross-section of the crosshead die 36 schematically shown in FIG. 3. Extruder 34 having auger 138 passes material into inlet 140 of the die housing 142 which is held together by four axial screws 144 and vertical screws 146. The fluoropolymer tube 148 moves in axial fashion through the die housing 142 so that the thermoset or thermoplastic polymer material can be extruded around it resulting in the composite tube 150 exiting from the housing. The thermoset or thermoplastic polymer material passes through inlet 140 and moves around channel 152. The desired final outer diameter of the thermoset or thermoplastic polymer material is controlled by the die 154. The housing is heated by elements 156.

The fuel line or pipe of the present invention is designed to carry hydrocarbon fuels that are generally used in vehicles such as automobiles, trucks, airplanes, locomotives, and the like. The fuel is generally heavy in hydrocarbon materials such as propane, butane and aromatics, such as benzene, toluene and other combustible organic materials. The combined laminate or composite therefore prevents the escape of fuel vapors from the fuel line. Other fuels such as alcohol-based fuels may also be carried in the fuel pipe of the present invention. Further, other hydrocarbon-based fluids such as hydraulic fluids may likewise be utilized in conjunction with the pipe of the present invention. Finally, the properties of the pipe of this invention make it an excellent choice for general chemical handling.

It is to be appreciated that by using the multiple extrusion stages at different positions in the manufacturing process, one can efficiently combine a fluoropolymer that has a high melt extrusion temperature with a thermoset or thermoplastic polymer material which typically have substantially lower extrusion temperatures. By melt extruding the fluoropolymer layer(s) first and then cooling down the formed pipe by running the formed tube through room temperature water, one can thereafter use a separate and distinctly different thermoset or thermoplastic polymer to extrude onto the pipe and avoid thermal degradation.

EXAMPLE 1

The surface energy of various treated fluoropolymers was tested. When a dyne solution is placed on a material surface and wets out, that indicates that the material has a higher surface energy than the dyne solution. If the drop "beads up," the material has a lower surface energy than the dyne solution. The use of the dyne solutions is a technique for determining the surface energy of materials. Various samples were prepared of fluoropolymer substrates. Each of the substrates were subjected to a dyne solution identified as ethyl Cello-Solve-Formamide (Trademark of Corotec of Connecticut, U.S.A.). The sample plaques were wiped clean with a dry cloth to remove surface contamination. Solvent was not used to avoid any surface effects from the residue. The dyne solution was applied in a single side-stroke of the brush to leave a ¾ inch by 1 inch patch of solution. Measurements were taken on both treated and untreated samples. The values recorded represent solution which held in a continuous film for greater than 2 seconds. Treated samples were prepared by sweeping the discharge head of the Enercon-Dyne-A-Mite device. Treated samples were prepared by sweeping the discharge head across the plaque at a rate of ¼ inch to ½ inch away from the sample surface. Two passes were made to ensure complete coverage. Listed below are the test results for the samples tested.

| Sample | Initial ($E_S$ – Surf. Energy) | After Treatment ($E_S$ – Surf. Energy) |
| --- | --- | --- |
| KYNAR 740[1] | 42, 41, 42 | 44, 45, 44 |
| HYLAR 460[2] | 45, 46, 45 | 64, 58, 60 |
| HALAR 500[3] | 34, 35, 34 | 40, 37 ,39 |
| TEFZEL 200[4] | L30, L30, L30 | 34, 34, 33 |

[1]KYNAR 740 is a trademark of Atochem of North America for PVDF.
[2]HYLAR 460 is a trademark of Ausimont of Morristown, New Jersey for PVDF.
[3]HALAR 500 is a trademark of Ausimont of Morristown, New Jersey for ECTFE.
[4]TEFZEL 200 is a trademark of DuPont of Wilmington, Delaware for ETFE.

The results indicate that there is a change in surface energy which indicates that the Enercon mixed gas plasma discharge device activates the fluorinated samples, and that they may be satisfactory substrates for extrusion of a thermoset or thermoplastic polymer through the formation of chemical bonds between the layers.

EXAMPLE 2

Two 4"×4"×0.010" sheets of extruded ETFE (DuPont Tefzel® 200) were labeled as sample A and sample B. A slab of uncured ethylene/acrylic elastomer (DuPont VAMAC®) was placed over sample A and the two materials were clamped together for curing. Sample B was exposed for approximately 5 seconds to a charged gaseous atmosphere as previously described and then combined with a VAMAC® layer and clamped as with sample A. Both samples were placed in a circulating air oven at 180° C. for 30 minutes to cure the thermosetting layer. Samples were then removed and allowed to cool at room temperature for 30 minutes. Samples were removed from clamps and cut into strips using an ASTM 1/8"×6" die and Arbor press. Six strips from each sample were tested for lap shear strength by separating the layers at the ends of the strip, leaving a 30 mm section of joined material at the center. Each layer of the strip was attached to an opposing tensile machine fixture and the sample was pulled apart at a rate of 50.8 mm/min. Maximum load obtained during the test was recorded. As can be seen from the results, a greater than 500% increase in bond strength over the unexposed samples was achieved by exposure of the substrate to the charged gaseous atmosphere. Actual bond strength of exposed samples is assumed to be greater than reported as all 6 strips failed by tensile failure of the ETFE layer, rather than by separation at the interface.

| Sample | Average Maximum Load (Newtons) | Standard Deviation |
| --- | --- | --- |
| Sample A No exposure | 4.5 N | 0.8 |
| Sample B Exposed to charged gaseous atmosphere | 28.5 N | 5 |

EXAMPLE 3

Two 1" diameter tubes of extruded ETFE were labeled sample A and sample B. Two propane torches were adjusted to produce a 6" flame, and held by hand so that only the tip of the flame contacted the ETFE surface of sample B. The torches were positioned on opposite sides of sample B approximately 1.5' prior to sample B entering the mixed gas plasma chamber. Sample A entered the chamber without prior flame exposure. Subsequent to activation, a layer of nylon was extruded around the fluoropolymer tube. The samples were then tested for bond strength by separating the ETFE and Nylon layers and then pulling these layers apart on a tensile machine while recording force required to separate. These tests showed a 235% increase in maximum load (highest reading of force obtained during test), and a 387% increase in average load with the addition of the flame-treatment. Values obtained for Work (load×length pulled) could not be compared directly as the bond strength of the flame-treated sample was such that the ETFE inner layer failed after a 45 mm of pull as opposed to the standard test pull of 500 mm.

| Sample | Maximum Load (N) | Mean Load (N) |
| --- | --- | --- |
| A No flame treatment | 34.37 | 16.85 |
| B With flame treatment | 115.2 | 82.32 |

While activation of surface states in the fluoropolymer in the foregoing, specific examples was by a mixed gas plasma, activation may be similarly accomplished by other techniques of the present invention, with equal advantage. For example, exposure of the polymer to high intensity U.V. radiation from a Kr/F excimer laser also raises the surface energy of the fluoropolymer, as does bombardment with an electron beam. Chemical treatment, as by the aforementioned sodium naphthalate bath also increases surface energy in a similar manner.

While the forms of the invention herein described constitute presently preferred embodiments, many other are possible. It is not intended herein to mention all the possible equivalent forms or ramifications of the invention. It is understood that the terms used herein are merely descriptive rather than limiting and that various changes may be made without departing from the spirit or scope of the invention.

What is claimed is:

1. A method of preparing a layered product comprising the steps of:

forming a fluoropolymer substrate having a first surface and a second surface;

exposing said first surface to a flame;

thereafter, subjecting said first surface to a mixed gas plasma discharge; and applying to said first surface a polymer selected from the group consisting of thermoplastic polymers and thermoset polymers, so as to form chemical bonds between the layers.

2. The method of claim 1 wherein said step of forming comprises extruding said fluoropolymer substrate.

3. The method of claim 1 wherein said step of exposing comprises contacting said first surface with a tip of said flame.

4. The method of claim 1 wherein said flame is a propane torch flame.

5. The method of claim 1 wherein said step of exposing comprises contacting said first surface with a flame of sufficient temperature and for sufficient duration to smooth said first surface.

6. The method of claim 1 wherein said step of subjecting comprises moving said fluoropolymer substrate through said mixed gas plasma discharge at a rate of 1 to 50 linear feet/minute.

7. The method of claim 1 wherein said step of subjecting comprises contacting said first surface with said mixed gas plasma discharge at ambient temperature and pressure.

8. The method of claim 1 and further comprising the step of applying heat and pressure to said layered product subsequent to said step of applying said polymer to said first surface of said fluoropolymer.

9. The method of claim 1 wherein said step of applying comprises extruding said polymer onto said first surface of said fluoropolymer.

10. The layered product formed by the method of claim 1.

11. The layered product of claim 10 wherein said layered product comprises a fuel-carrying tube.

12. The layered product of claim 10 wherein said fluoropolymer substrate comprises a multi-layer tube having an inner conductive fluoropolymer layer and an outer non-conductive fluoropolymer layer.

13. The layered product of claim 10 wherein said polymer comprises a polyamide.

14. The layered product of claim 10 wherein said polymer comprises a copolymer of ethylene and methyl acrylate.

* * * * *